US012625260B2

(12) United States Patent
Tsuboi

(10) Patent No.: US 12,625,260 B2
(45) Date of Patent: May 12, 2026

(54) SOUND WAVE PROCESSING DEVICE AND ULTRASONIC SYSTEM

(71) Applicant: Rohm Co., Ltd., Kyoto (JP)

(72) Inventor: Takahiro Tsuboi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 66 days.

(21) Appl. No.: 18/534,356

(22) Filed: Dec. 8, 2023

(65) Prior Publication Data

US 2024/0111047 A1    Apr. 4, 2024

Related U.S. Application Data

(63) Continuation of application No. PCT/JP2022/022918, filed on Jun. 7, 2022.

(30) Foreign Application Priority Data

Jun. 9, 2021    (JP) ................................. 2021-096559

(51) Int. Cl.
*G01S 15/931* (2020.01)
*G01S 7/534* (2006.01)

(52) U.S. Cl.
CPC ............ *G01S 15/931* (2013.01); *G01S 7/534* (2013.01)

(58) Field of Classification Search
CPC .......... G01S 7/527; G01S 7/534; G01S 7/536; G01S 15/931
See application file for complete search history.

(56) References Cited

U.S. PATENT DOCUMENTS

| | | | | |
|---|---|---|---|---|
| 9,157,984 | B2 * | 10/2015 | Miyamoto | ............ G06F 3/0433 |
| 9,316,717 | B2 * | 4/2016 | Gicklhorn | ................. G01S 5/18 |
| 11,176,952 | B2 * | 11/2021 | Thiergart | .............. G10L 19/018 |

(Continued)

FOREIGN PATENT DOCUMENTS

| | | |
|---|---|---|
| JP | 2005-152450 | 6/2005 |
| JP | 2020-197489 | 12/2020 |

(Continued)

OTHER PUBLICATIONS

International Search Report and Written Opinion in International Appln. No. PCT/JP2022/022918, mailed on Aug. 9, 2022, 15 pages (with machine translation).

(Continued)

*Primary Examiner* — Daniel L Murphy
*Assistant Examiner* — Amie M Ndure
(74) *Attorney, Agent, or Firm* — Fish & Richardson P.C.

(57) ABSTRACT

A sound wave processing device includes a transmission signal generation unit that generates a transmission signal for transmitting a sound wave, a received wave signal output unit that outputs a received wave signal based on receiving the sound wave, a correlation-convolution integral processing unit that performs correlation-convolution integral processing in parallel for each reference wave data, on the basis of the received wave signal and a plurality of reference wave data, and an own wave identification unit that determines whether or not the received sound wave is own wave, which is a reflected wave of the sound wave transmitted by the transmission signal generation unit, on the basis of a correlation-convolution integral value output from the correlation-convolution integral processing unit.

12 Claims, 13 Drawing Sheets

(56) References Cited

U.S. PATENT DOCUMENTS

| | | | | |
|---|---|---|---|---|
| 11,928,449 | B2 * | 3/2024 | Chen ..................... | H04L 67/125 |
| 12,061,698 | B2 * | 8/2024 | Zhao ..................... | G06F 21/565 |
| 2010/0286949 | A1 * | 11/2010 | Miyamoto .......... | G06F 3/03545 |
| | | | | 367/127 |
| 2011/0261654 | A1 * | 10/2011 | Miyamoto ............... | G01S 5/18 |
| | | | | 367/125 |
| 2012/0113753 | A1 * | 5/2012 | Miyamoto ............. | G01S 11/16 |
| | | | | 367/100 |
| 2023/0273291 | A1 * | 8/2023 | Ozturk ................... | G01S 7/006 |
| | | | | 342/52 |

FOREIGN PATENT DOCUMENTS

| | | | | |
|---|---|---|---|---|
| JP | WO2020004609 | A1 * | 6/2021 | ............ G01S 15/32 |
| WO | WO 2020/004609 | | 1/2020 | |

OTHER PUBLICATIONS

JP OA—Japanese Patent Office, Office Action in Japanese Appln. No. 2023-527868, dated Nov. 4, 2025, 8 pages (with English translation).

* cited by examiner

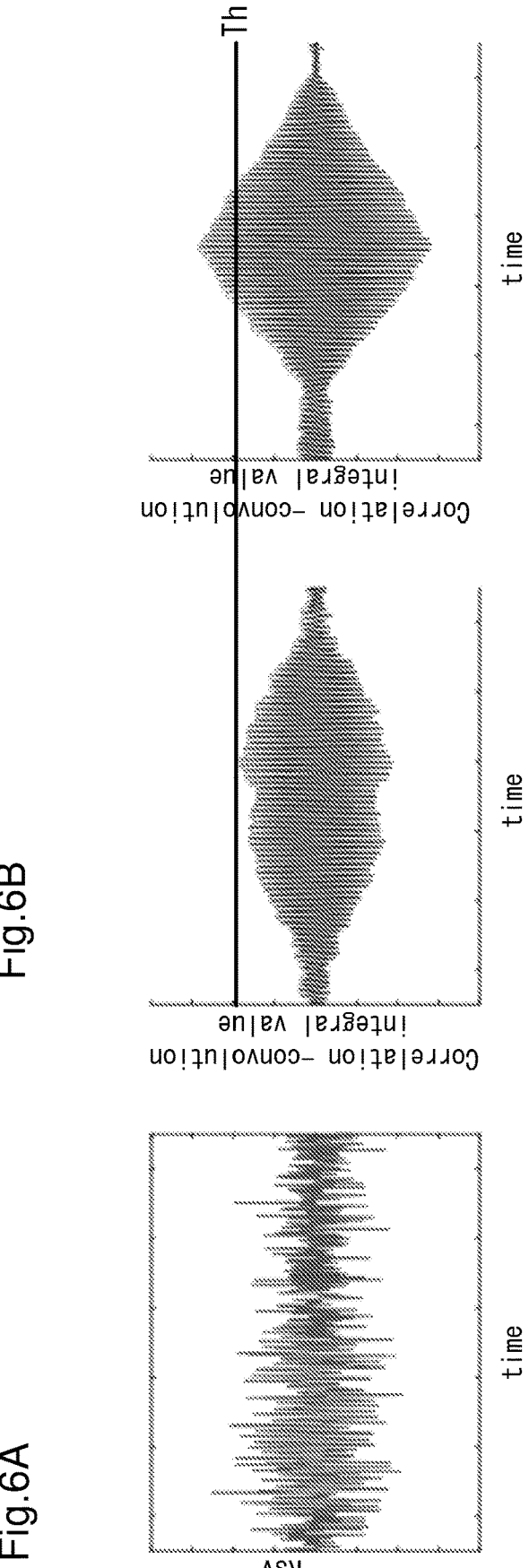

Fig.9

| Number of samples | S/N(dB) | 55kHz | 56kHz | 57kHz | 58kHz | 59kHz | 60kHz | 61kHz |
|---|---|---|---|---|---|---|---|---|
| 128 | No noise | 42 | 58 | 92 | 128 | 90 | 50 | 32 |
| 128 | 3.0 | 48 | 56 | 72 | 94 | 84 | 58 | 40 |
| 128 | 0.5 | 46 | 54 | 66 | 86 | 78 | 54 | 40 |
| 256 | No noise | 44 | 60 | 110 | 256 | 102 | 50 | 34 |
| 256 | 3.0 | 58 | 66 | 120 | 182 | 98 | 48 | 64 |
| 256 | 0.5 | 56 | 66 | 102 | 158 | 86 | 48 | 64 |

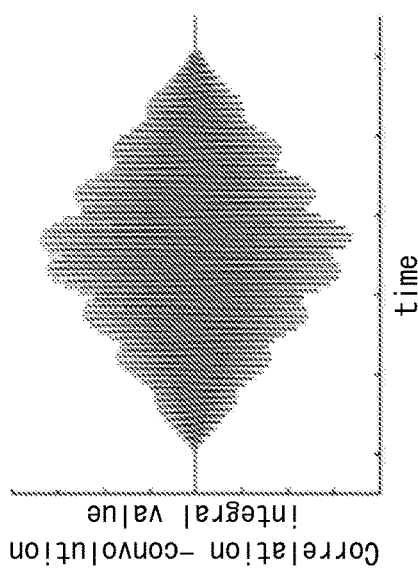
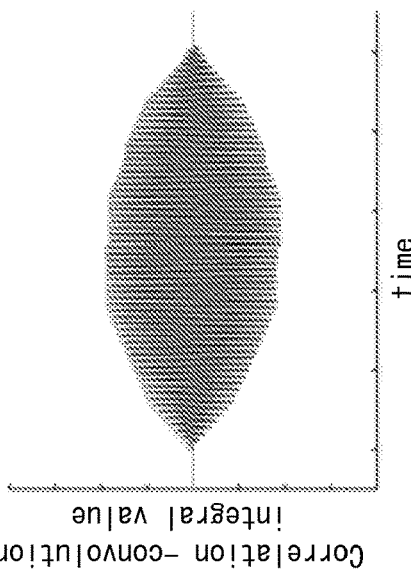
Fig.12B
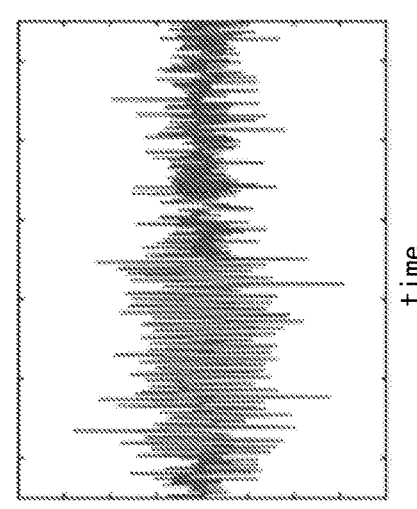
Fig.12A

SOUND WAVE PROCESSING DEVICE AND ULTRASONIC SYSTEM

CROSS-REFERENCE TO RELATED APPLICATIONS

This nonprovisional application is a continuation application of International Patent Application No. PCT/JP2022/022918 filed on Jun. 7, 2022, which claims priority Japanese Patent Application No. 2021-096559 filed on Jun. 9, 2021, the entire contents of which are hereby incorporated by reference.

TECHNICAL FIELD

The present disclosure relates to a sound wave processing device and an ultrasonic system.

BACKGROUND ART

Conventionally, there is known an ultrasonic system that measures a distance to an obstacle, by generating a sound wave and measuring time TOF (Time Of Flight) until returning of a reflected wave from the obstacle. Conventionally, this ultrasonic system is usually mounted on a vehicle, and an on-vehicle clearance sonar is known as an example.

As an example of this conventional ultrasonic system, there is a system in which waveform data (reference wave data) that is anticipated to be received is prepared, and correlation-convolution integral processing based on the reference wave data and an actually received reception signal is performed, so as to emphasize the reflected wave. This system is also called a pulse compression system, and can improve an S/N ratio. Note that the pulse compression system is described in Patent Document 1, for example.

LIST OF CITATIONS

Patent Literature

Patent Document 1: JP-A-2005-152450

BRIEF DESCRIPTION OF DRAWINGS

FIG. 6A is a diagram illustrating the received wave signal of the simulation result according to the comparative example (the number of samples=256).
FIG. 6B is a diagram illustrating the correlation-convolution integral values of the simulation result according to the comparative example (the number of samples=256).

FIG. 9 is a table showing an example of correlation maximum values.
FIG. 12A is a diagram illustrating the received wave signal of the simulation result according to the comparative example (when the vehicle is moving).
FIG. 12B is a diagram illustrating the correlation-convolution integral values of the simulation result according to the comparative example (when the vehicle is moving).

DESCRIPTION OF EMBODIMENTS

Figure 1:
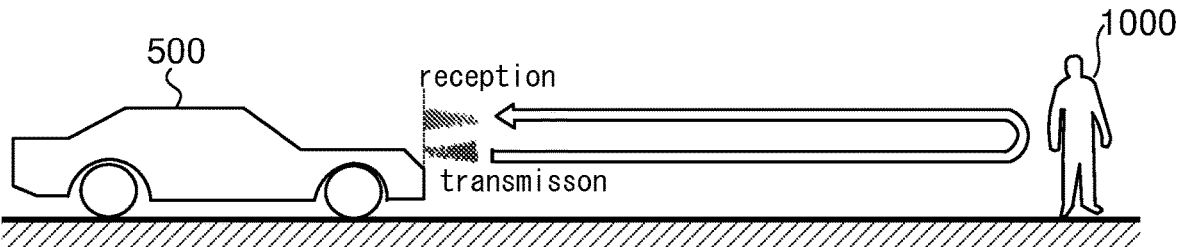
FIG. 1 is a diagram schematically illustrating a vehicle equipped with an ultrasonic system and an object.

Hereinafter, an exemplified embodiment is described with reference to the drawings. Note that an ultrasonic system according to the embodiment described below is intended to be mounted on a vehicle as an example, and can be used for a warning function, an automatic braking function, an automatic parking function, or the like, by measuring a distance between the vehicle and an object.
<1. Correlation Processing>
First, an outline of correlation processing that is used in the ultrasonic system is described. FIG. 1 illustrates a vehicle 500 equipped with the ultrasonic system (not shown) and an object (obstacle) 1000. An ultrasonic wave transmitted from the ultrasonic system is reflected by the object 1000 and is received as a reflected wave by the ultrasonic system.

Figure 2:
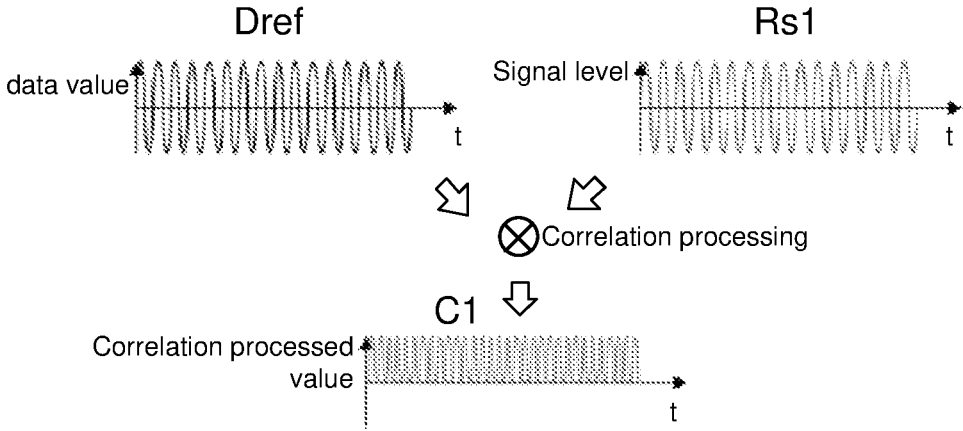
FIG. 2 is a diagram illustrating an example of correlation processing.

Here, the correlation processing is described with reference to FIGS. 2 and 3. In FIG. 2, reference wave data Dref is prepared in advance. The reference wave data Dref is waveform data of the reflected wave that is assumed to be received, and is waveform data having the same frequency as that of a sound wave that is transmitted. The frequency of a reflected wave Rs1 illustrated in FIG. 2 is the same as the transmitted wave frequency. In other words, the reflected wave Rs1 is own wave. Therefore, in a correlation result C1 obtained by correlation processing in which the reference wave data Dref and the reflected wave Rs1 are multiplied, a correlation processed value is always a positive value as illustrated in FIG. 2. Therefore, a convolution integral value obtained by time integral of the correlation result C1 is increased.

Figure 3:
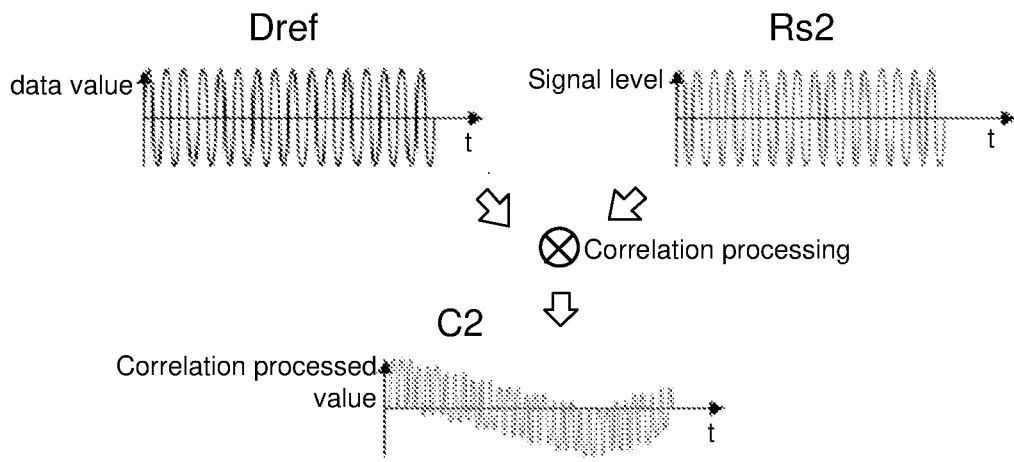
FIG. 3 is a diagram illustrating an example of correlation processing.

On the other hand, the frequency of a reflected wave Rs2 illustrated in FIG. 3 is shifted from the transmitted wave frequency. In other words, the reflected wave Rs2 is other wave, and the frequency of the reflected wave Rs2 is shifted from the frequency of the reference wave data Dref. Therefore, as illustrated in FIG. 3, in a correlation result C2, the correlation processed value is negative in a certain period, and hence the convolution integral value is smaller than that in FIG. 2. In this way, the own wave and the other wave can be discriminated from each other.

2. Comparative Example

Figure 4:
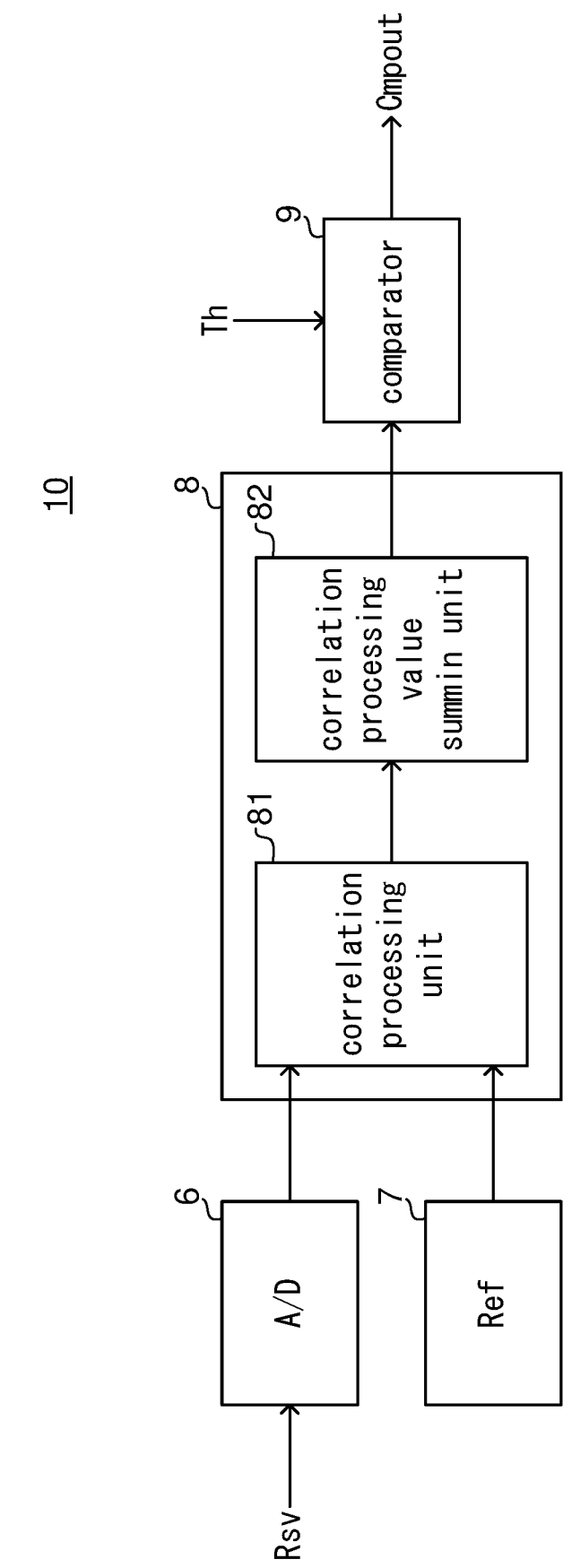
FIG. 4 is a diagram illustrating a structure of a reception processing unit according to a comparative example.

Here, before description of the embodiment, a comparative example is described for comparison with the embodiment. FIG. 4 is a diagram illustrating a structure of a reception processing unit 10 according to the comparative example. The reception processing unit 10 illustrated in FIG. 4 includes an A/D converter 6, a reference wave storage unit 7, a correlation-convolution integral processing unit 8, and a comparator 9.

The A/D converter 6 performs A/D (analog to digital) conversion of a received wave signal Rsv based on the received ultrasonic wave. The reference wave storage unit 7 stores reference wave data having the same frequency as that of the ultrasonic wave transmitted from the ultrasonic system including the reception processing unit 10.

The correlation-convolution integral processing unit 8 includes a correlation processing unit 81 and a correlation processed value summing unit 82. The correlation processing unit 81 includes a buffer (not shown) that can store the received wave signal Rsv after conversion by the A/D converter 6, for a predetermined number of samples. The correlation processing unit 81 multiplies the received wave signal Rsv stored in the buffer and the reference wave data for each sample, so as to calculate the correlation processed value. The correlation processed value summing unit 82 calculates the sum of the correlation processed values calculated by the correlation processing unit 81 for the samples, so as to calculate the correlation-convolution integral value.

The comparator 9 compares the correlation-convolution integral value output from the correlation processed value summing unit 82 with a threshold value Th, and outputs the comparison result as a determination signal Cmpout. If the correlation-convolution integral value is larger than the threshold value Th, the determination signal Cmpout is output indicating that the received wave is the reflected wave (own wave) based on the ultrasonic wave transmitted from the ultrasonic system including the reception processing unit 10.

In this way, the reception processing unit 10 sequentially stores the received wave signal Rsv in the buffer, and calculates the correlation-convolution integral value, so as to compare the calculated correlation-convolution integral value with the threshold value. Here, an example of the simulation result by the reception processing unit 10 is described with reference to FIGS. 5A, 5B, 6A, and 6B.

Figures 5A, 5B:
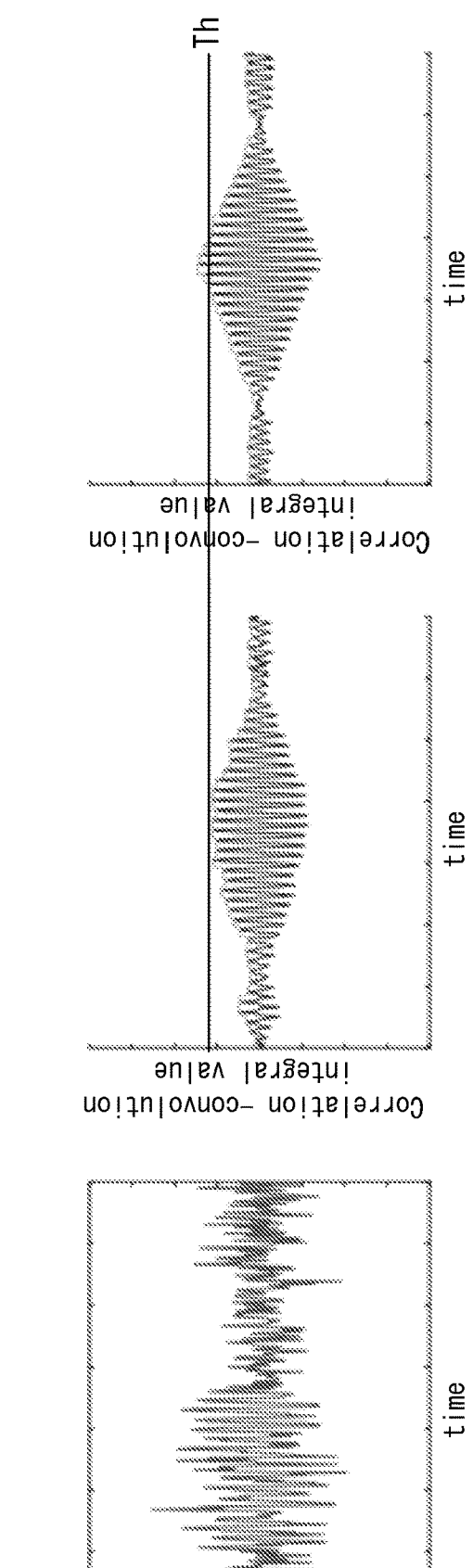
FIG. 5A is a diagram illustrating a received wave signal of a simulation result according to the comparative example (the number of samples=128).
FIG. 5B is a diagram illustrating correlation-convolution integral values of the simulation result according to the comparative example (the number of samples=128).

FIGS. 5A and 5B illustrate the simulation result in the case where the ultrasonic system including the reception processing unit 10 transmits the ultrasonic wave of 58 kHz, for example, and the reflected wave based on the transmitted ultrasonic wave is received. FIG. 5A illustrates a waveform of the received wave signal Rsv. FIG. 5B illustrates the correlation-convolution integral processing result based on the received wave signal Rsv. Note that FIGS. 5A and 5B illustrates a case where the number of samples used for the correlation-convolution integral processing is 128, and eight samples are set for one wave to be transmitted, so that the ultrasonic wave of 128/8=16 wave numbers is transmitted. Further, the left side in FIG. 5B illustrates a case where the reference wave data is 57 kHz, while the right side illustrates a case where the reference wave data is 58 kHz. The correlation-convolution integral value has a waveform oscillating between positive and negative.

As illustrated in FIG. 5A, the reflected wave of the transmitted ultrasonic wave on which ambient noises are superimposed is received (in FIG. 5A, an S/N ratio=3 dB). Due to the ambient noises, as illustrated in FIG. 5B, there is a small difference between a maximum value (positive value) of the correlation-convolution integral value based on the reference wave data at 57 kHz that is a frequency shifted from the that of the transmitted ultrasonic wave, and a maximum value of the correlation-convolution integral value based on the reference wave data at 58 kHz that is the frequency of the transmitted ultrasonic wave. Therefore, it is difficult to set the threshold value Th between the two maximum values.

In contrast, FIGS. 6A and 6B illustrate the simulation result in a case where the number of samples is 256 (transmitted wave number=256/8=32). FIG. 6A illustrates the received wave signal Rsv, and FIG. 6B illustrates the correlation-convolution integral processing result. In this way, by increasing the number of samples from 128 described above to 256, the difference between the maximum values of the correlation-convolution integral values is increased as illustrated in FIG. 6B, and it becomes easy to set the threshold value Th between the two maximum values.

However, if the number of samples is increased, it is necessary to increase capacity of the buffer. The increase in capacity of the buffer causes an increase in cost of a circuit for the correlation-convolution integral processing. In addition, it is preferred that the wave number is smaller also in view of the service life of the ultrasonic system.

Furthermore, if the distance between the ultrasonic system and the object is increased, the power of the transmitted ultrasonic wave is attenuated before being received after being reflected by the object, and hence the absolute value of the correlation-convolution integral value is decreased. For instance, the amplitude of the waveform illustrated in FIG. 5B or 6B is decreased. Therefore, the control is necessary to dynamically change the threshold value Th in accordance with the above distance.

3. First Embodiment

Figure 7:
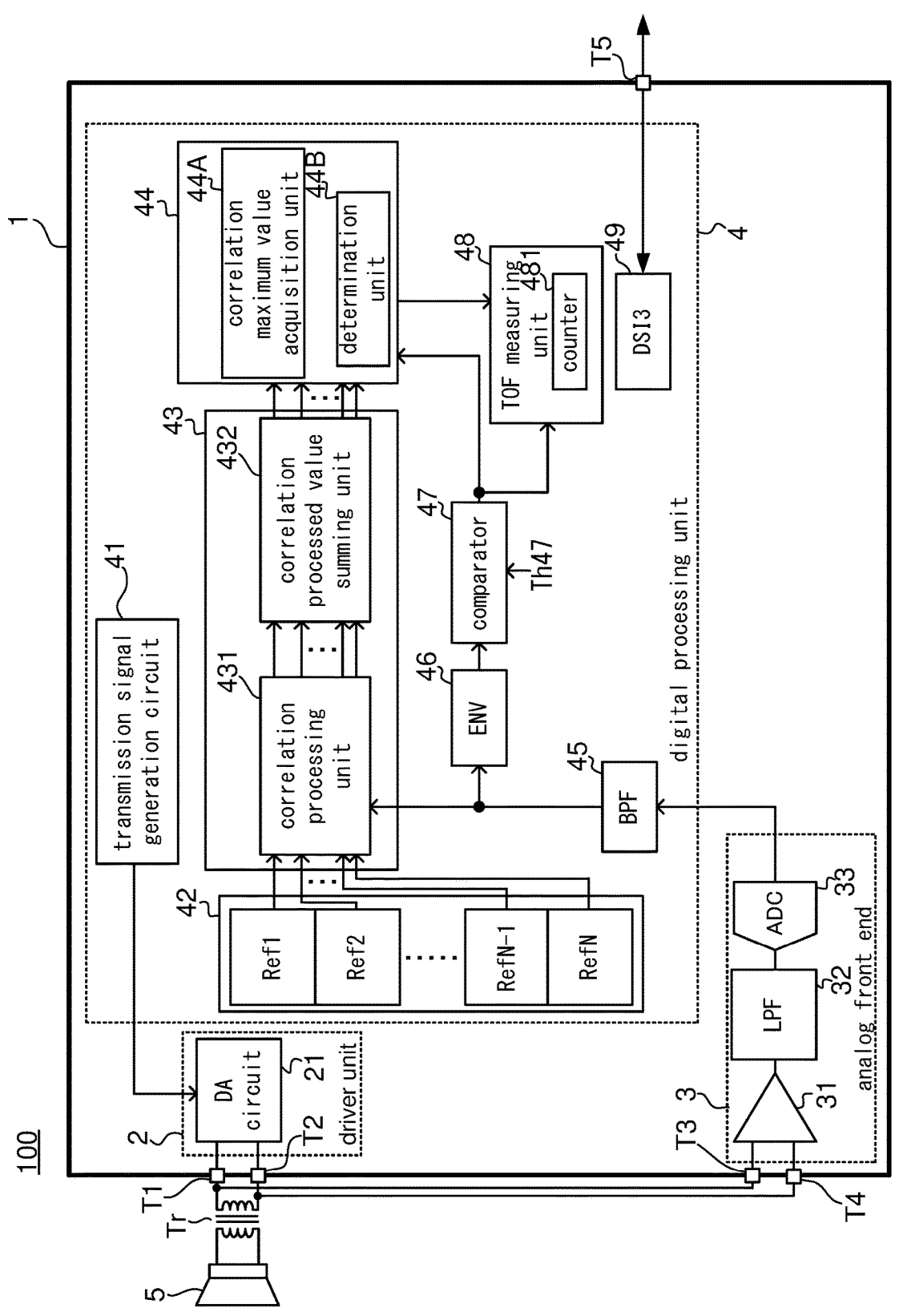
FIG. 7 is a diagram illustrating a structure of the ultrasonic system according to a first embodiment.

In order to solve the problem in the comparative example described above, a first embodiment is implemented as follows. FIG. 7 is a diagram illustrating a structure of the ultrasonic system 100 according to the first embodiment.

The ultrasonic system 100 includes a sound wave processing device 1, an ultrasonic wave transmitting/receiving device 5, and a transformer Tr. The ultrasonic wave transmitting/receiving device 5 is externally connected to the sound wave processing device 1 via the transformer Tr. Note that it is not always necessary to dispose the transformer Tr.

The sound wave processing device 1 is a semiconductor device including a driver unit 2, an analog front end 3, a digital processing unit 4, which are integrated in a single chip. The driver unit 2 includes a DA circuit 21. The DA circuit 21 performs D/A conversion from a digital signal to an analog signal of the transmission signal output from a transmission signal generation circuit 41 included in the digital processing unit 4. The DA circuit 21 is connected to a primary side of the transformer Tr via external terminals T1 and T2.

A secondary side of the transformer Tr is connected to the ultrasonic wave transmitting/receiving device 5. The ultrasonic wave transmitting/receiving device 5 includes a not-shown piezoelectric element, so as to transmit and receive the ultrasonic wave. In other words, the ultrasonic wave transmitting/receiving device 5 functions as both a sound source and a receiver.

The analog front end 3 (received wave signal output unit) includes a low noise amplifier (LNA) 31, a low pass filter (LPF) 32, and an A/D converter 33. The primary side of the transformer Tr is connected to the LNA 31 via external terminals T3 and T4. The output of the LNA 31 is input to the A/D converter 33 via the LPF 32.

The digital processing unit 4 includes the transmission signal generation circuit 41, a register (reference wave storage unit) 42, a correlation-convolution integral processing unit 43, an own wave identification unit 44, a band pass filter (BPF) 45, an envelope detection unit 46, a comparator 47, a TOF measuring unit 48, and a serial interface 49.

The register 42 stores reference wave data Ref1 to RefN (N is an integer of 2 or more). In other words, the register 42 stores a plurality of reference wave data. The reference wave data Ref1 to RefN are waveform data having neighboring frequencies including the frequency of the ultrasonic wave transmitted by the transmission signal generation circuit 41 from the ultrasonic wave transmitting/receiving device 5 (hereinafter referred to as the transmitted wave frequency). For instance, the neighboring frequencies include frequencies shifted from the transmitted wave frequency with an interval of 1 kHz. For instance, if the transmitted wave frequency is 58 kHz, the reference wave data may have Ref1 of 55 kHz, Ref2 of 56 kHz, Ref3 of 57 kHz, Ref4 of 58 kHz, Ref5 of 59 kHz, Ref6 of 60 kHz, and Ref7 of 61 kHz (N=7), as an example. Note that 1 kHz is an example of the shift between neighboring frequencies, and the shift may be selectable.

The BPF 45 extracts and outputs a signal in a predetermined band from the received wave signal output from the A/D converter 33. The predetermined band is a band including the transmitted wave frequency. In this way, received wave signals having frequencies shifted largely from the transmitted wave frequency can be removed. Note that the predetermined band may be selectable. For instance, it may be selectable within the transmitted wave frequency ±1 kHz to the transmitted wave frequency ±8 kHz.

The envelope detection unit 46 detects the envelope of the received wave signal output from the BPF 45, and outputs the detected envelope. The comparator 47 compares the detected envelope with a predetermined threshold value Th47, and outputs the comparison result. Using the envelope detection unit 46 and the comparator 47, it can be detected that an ultrasonic wave having a certain degree of power has been received, and it is possible not to perform own wave determination during a no-signal period as described later.

The correlation-convolution integral processing unit 43 includes a correlation processing unit 431 and a correlation processed value summing unit 432.

The correlation processing unit 431 includes a buffer (not shown) that can store the received wave signals output from the BPF 45 for a predetermined number of samples. The correlation processing unit 431 multiplies the received wave signal stored in the buffer and each of the reference wave data Ref1 to RefN for each sample, so as to calculate the correlation processed value. In other words, the correlation processed value for each of the reference wave data Ref1 to RefN is calculated. The correlation processed value summing unit 432 calculates the sum of the correlation processed values for individual samples calculated by the correlation processing unit 431 for each of the reference wave data Ref1 to RefN, so as to calculate the correlation-convolution integral value. In other words, the correlation-convolution integral value for each of the reference wave data Ref1 to RefN is calculated.

Figure 8:
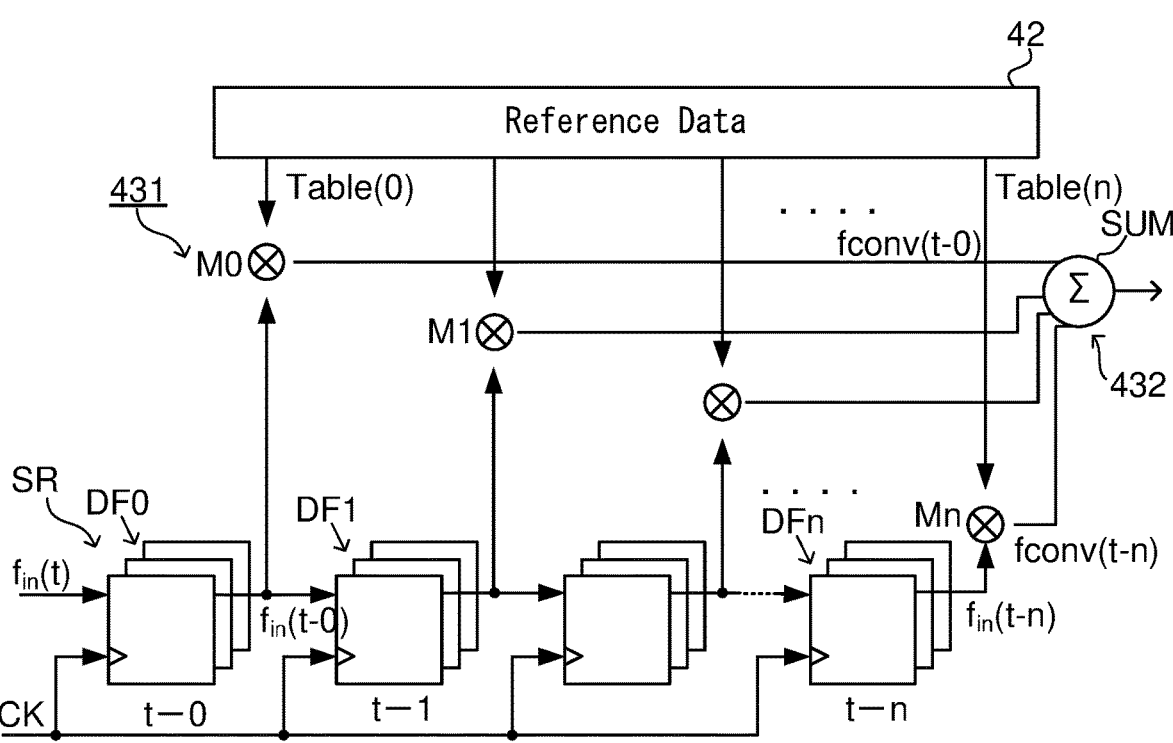
FIG. 8 is a diagram illustrating a specific structural example of a correlation processing unit and a correlation processed value summing unit.

Here, FIG. 8 is a diagram illustrating a specific structural example of the correlation processing unit 431 and the correlation processed value summing unit 432. As illustrated in FIG. 8, the correlation processing unit 431 includes a shift register SR and multiplication units M0 to Mn. The shift register SR functions as a buffer.

The shift register SR includes flip-flop groups DF0 to DFn. Each of the flip-flop groups DF0 to DFn is constituted of D flip-flops of the number of bits of the received wave signal fin(t). For instance, if the received wave signal fin(t) has 12 bits, the flip-flop groups DF0 to DFn are each constituted of 12 D flip-flops.

The flip-flop groups DF0 to DFn are arranged in order from former stage. The received wave signal fin(t) is input to an input terminal of the flip-flop group DF0. In the flip-flop groups DF0 to DFn, an output terminal of a former stage is connected to an input terminal of a post stage. A clock signal CK is input to a clock terminal of each of the flip-flop groups DF0 to DF.

Using this shift register SR, every time when a pulse of the clock signal CK is input, each output of the flip-flop groups DF0 to DFn is bit shifted from the former stage to the post stage. Outputs fin(t–0) to fin(t–n) of the flip-flop groups DF0 to DFn are input to the multiplication units M0 to Mn, respectively. In addition, the reference wave data Table(0) to Table(n) stored in the register 42 are also input to the multiplication units M0 to Mn, respectively. Therefore, (n+1) pieces data of the received wave signal fin(t–0) to fin(t–n) stored in the shift register SR and the reference wave data Table(0) to Table(n) are respectively multiplied by the multiplication units M0 to Mn, and correlation processed values fconv(t–0) to fconv(t–n) are output.

Note that it is preferred that the number (n+1) is set based on wave transmission time (wave number) of the transmission signal and a sampling frequency of the received wave signal, and that it is set so that at least the received wave signals for the wave transmission time can be fetched.

As illustrated in FIG. 8, the correlation processed value summing unit 432 includes a sum calculation unit SUM. The sum calculation unit SUM calculates the sum of the obtained correlation processed values fconv(t–0) to fconv(t–n), so as to output the correlation-convolution integral value.

Note that the multiplication units M0 to Mn and the sum calculation unit SUM are disposed for each of the reference wave data Ref1 to RefN. In other words, N sets of the multiplication units M0 to Mn and the sum calculation unit SUM are disposed. In this way, the correlation-convolution integral value is calculated for each of the reference wave data Ref1 to RefN.

In this way, the correlation-convolution integral processing unit 43 performs the correlation-convolution integral processing in parallel for each of the reference wave data Ref1 to RefN.

The own wave identification unit 44 (FIG. 7) includes a correlation maximum value acquisition unit 44A and a determination unit 44B. On the basis of an output of the comparator 47, the correlation maximum value acquisition unit 44A acquires a maximum value of the correlation-convolution integral value (correlation maximum value) output from the correlation processed value summing unit 432, during the period while the envelope detected by the envelope detection unit 46 is larger than the threshold value Th47 (the period after the envelope exceeds the threshold value Th47 until it becomes the threshold value Th47 or smaller). The correlation maximum value is acquired for each of the reference wave data Ref1 to RefN. Note that it is preferred that the correlation maximum value acquires the maximum value of the absolute value of the correlation-convolution integral value. However, it may acquire only the maximum value of positive correlation-convolution integral values or only the maximum value of absolute values of negative correlation-convolution integral values.

The determination unit 44B determines whether or not the ultrasonic wave received by the ultrasonic wave transmitting/receiving device 5 is the reflected wave (own wave) based on the ultrasonic wave transmitted from the ultrasonic wave transmitting/receiving device 5 by the transmission signal generation circuit 41, on the basis of the correlation maximum value acquired by the correlation maximum value acquisition unit 44A.

As a first determination method by the determination unit 44B, the determination unit 44B determines whether or not the received ultrasonic wave is the own wave, on the basis of whether or not the frequency of the reference wave data to be the maximum value among correlation maximum values of the reference wave data Ref1 to RefN is equal to the transmitted wave frequency.

Here, FIG. 9 is a table showing an example of correlation maximum values acquired when the own wave of the transmitted wave frequency of 58 kHz is received, and when the reference wave data Ref1 to RefN are reference wave data of 55 kHz to 61 kHz (N=7). Note that FIG. 9 shows a result in the combination of the condition of the number of samples (the number of samples=128 or 256) and the condition of noises superimposed on the received wave signal (no noise, S/N=3 dB, or S/N=0.5 dB).

In this way, even if the number of samples is set to 128 less than 256, also when a noise is superimposed (S/N=3 dB or 0.5 dB), the frequency at which the correlation maximum value of each of the reference wave data Ref1 to RefN becomes the maximum value ("94" or "86") is the transmitted wave frequency of 58 kHz, and hence it can be determined to be the own wave.

In addition, as a second determination method by the determination unit 44B, the determination unit 44B acquires three largest correlation maximum values among the correlation maximum values of the reference wave data Ref1 to RefN. If frequencies of the acquired correlation maximum values are three neighboring frequencies, the determination unit 44B determines whether or not the received ultrasonic wave is the own wave, on the basis of whether or not the center frequency of the three neighboring frequencies is the transmitted wave frequency.

For instance, if the transmitted wave frequency is 58 kHz, it is determined whether or not frequencies of the three largest acquired correlation maximum values are neighboring frequencies of 57 kHz, 58 kHz, and 59 kHz. In the example shown in FIG. 9, even if the number of samples is set to 128 less than 256, also when a noise is superimposed (S/N=3 dB or 0.5 dB), frequencies of the three largest correlation maximum values ("72, 94, 84" or "66, 86, 78") are neighboring frequencies of 57 kHz, 58 kHz, and 59 kHz, and hence it can be determined to be the own wave.

In particular, using this second determination method, it is possible to suppress erroneous determination that it is not the own wave, even if the correlation maximum value of the transmitted wave frequency does not become maximum in the correlation maximum values of the reference wave data Ref1 to RefN, when the correlation maximum value at the transmitted wave frequency and the correlation maximum values at frequencies neighboring the transmitted wave frequency are varied.

In this way, in this embodiment, instead of absolute evaluation of comparing the correlation-convolution integral value with the threshold value like the comparative example, relative evaluation is performed for the correlation-convolution integral values of the reference wave data Ref1 to RefN. In this way, even if the number of samples is decreased, also when a noise is superimposed on the received wave signal, the own wave can be identified. As the number of necessary samples is decreased, circuit cost for the correlation-convolution integral processing can be reduced. In addition, even if a distance between the ultrasonic system 100 and an object is increased so that the correlation-convolution integral value is decreased, the own wave can be identified by the relative evaluation described above. In this way, the dynamic control of the threshold value as described above in the comparative example is not necessary.

The TOF measuring unit 48 uses a counter 481 to measure the time (TOF) after the ultrasonic wave is transmitted until the reflected wave from the object is received. The counter 481 starts counting when the transmission signal generation circuit 41 starts the transmission. Further, the TOF measuring unit 48 continues counting of the counter 481 until the determination unit 44B determines that the received ultrasonic wave is the own wave. When the determination unit 44B determines that the received ultrasonic wave is the own wave, the TOF measuring unit 48 holds a count value of the counter 481 at that time. The held count value corresponds to the TOF, and the distance to the object can be determined based on the TOF and the sonic speed.

The serial interface 49 conforms to DSI3, for example, and communicates with a not—shown external ECU (Electronic Control Unit of a vehicle) via an external terminal T5. The held count value described above is sent to the ECU via the interface 49.

4. Second Embodiment

Figure 10:
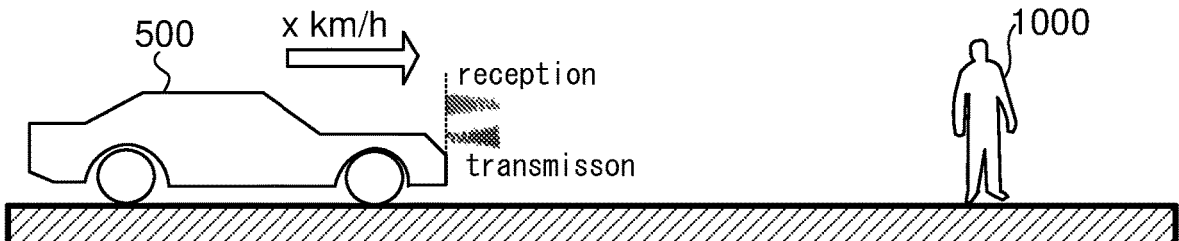
FIG. 10 is a schematic diagram illustrating a situation where the vehicle equipped with the ultrasonic system moves.

The method of comparing the correlation-convolution integral value with the threshold value using the single reference wave data and the received wave signal, as described above in the comparative example (FIG. 4), has the following problem, too. As illustrated in FIG. 10, when the vehicle 500 equipped with the ultrasonic system including the reception processing unit 10 according to the comparative example moves, or when the object 1000 moves, a phenomenon (Doppler shift) occurs, in which an ultrasonic wave having a frequency shifted from the frequency of the transmitted ultrasonic wave is received due to Doppler effect.

The frequency shift due to the Doppler effect is expressed by the following equation (1):

$$f=((V-v0)(V+vs)/(V+v0)(V-vs)) \cdot f0 \qquad (1),$$

where, f represents received wave frequency, V represents sonic speed, vs represents sound source speed, v0 represents object speed, and f0 represents transmitted wave frequency.

Figure 11B:
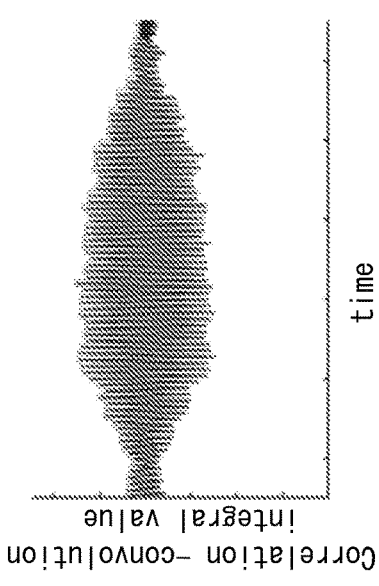
FIG. 11B is a diagram illustrating the correlation-convolution integral values of the simulation result according to the comparative example (when the vehicle is stopped).
Figure 11A:
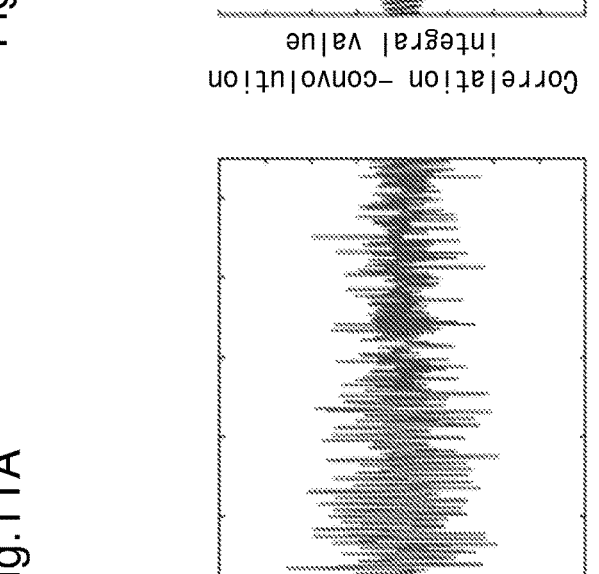
FIG. 11A is a diagram illustrating the received wave signal of the simulation result according to the comparative example (when the vehicle is stopped).

Here, FIGS. 11A and 11B show simulation results in the case, where the vehicle equipped with the ultrasonic system including the reception processing unit 10 is stopped (the object is also stopped), the ultrasonic system transmits the ultrasonic wave of 58 kHz (transmitted wave frequency=58 kHz), for example, and the reflected wave based on the transmitted ultrasonic wave is received. FIG. 11A shows the waveform of the received wave signal Rsv. FIG. 11B shows the result of the correlation-convolution integral processing based on the received wave signal Rsv. In FIG. 11B, the left side shows the case where the reference wave data is 58 kHz, and the right side shows the case where the reference wave data is 59 kHz.

In this case, the frequency of the received wave signal is the transmitted wave frequency of 58 kHz, and as illustrated in FIG. 11B, the maximum value of the correlation-convolution integral value based on the reference wave data of 58 kHz (stored in the reference wave storage unit 7) becomes large, so that it can be determined to be the own wave by comparison with the threshold value Th.

On the other hand, FIGS. 12A and 12B show simulation results in the case where the vehicle is approaching the object at 20 km/h (the object is stopped). FIG. 12A shows the waveform of the received wave signal Rsv. FIG. 12B shows the result of the correlation-convolution integral processing based on the received wave signal Rsv. In FIG. 12B, the left side shows the case where the reference wave data is 58 kHz, and the right side shows the case where the reference wave data is 59 kHz.

In this case, the frequency of the received wave signal is 58.9 kHz shifted from the transmitted wave frequency of 58 kHz due to the Doppler effect, and as illustrated in FIG. 12B, the maximum value of the correlation-convolution integral value based on the reference wave data of 58 kHz becomes small, so that it may be erroneously determined to be not the own wave by comparison with the threshold value Th.

In this way, in the comparative example, it may be erroneously determined to be not the own wave, although the own wave is received, due to an influence of the Doppler effect. In order to solve this problem, a second embodiment described below is implemented.

A structure of the ultrasonic system according to the second embodiment is the same as that of the first embodiment (FIG. 7) described above. In the second embodiment, the transmission is performed two times, and the process by the own wave identification unit 44 is as follows.

In the first transmission, the correlation maximum value acquisition unit 44A acquires the correlation maximum value of each of the reference wave data in the same manner as the first embodiment. The determination unit 44B determines the frequency of the reference wave data at which the acquired correlation maximum value becomes maximum.

In the second transmission, the correlation maximum value acquisition unit 44A acquires the correlation maximum value of each of the reference wave data in the same manner as the first embodiment. The determination unit 44B determines the frequency of the reference wave data at which the acquired correlation maximum value becomes maximum. Further, if the frequency determined in the first transmission is the same as the frequency determined in the second transmission, the determination unit 44B determines that the received ultrasonic wave is the own wave.

In the example described above in which the vehicle is moving at 20 km/h, the frequency determined in the first transmission and the frequency determined in the second transmission are both 59 kHz, and hence it can be determined to be the own wave.

Note that the process by the own wave identification 44 may be as follows.

In the first transmission, the correlation maximum value acquisition unit 44A acquires the correlation maximum value of each of the reference wave data similarly to the first embodiment. If frequencies of the three largest of the above acquired correlation maximum values are three neighboring frequencies, the determination unit 44B identifies the center frequency of the three frequencies.

In the second transmission, the correlation maximum value acquisition unit 44A acquires the correlation maximum value of each of the reference wave data similarly to the first embodiment. The determination unit 44B identified the frequency for the acquired correlation maximum value in the same manner as the first transmission. Further, if the frequency determined in the first transmission is the same as the frequency determined in the second transmission, the determination unit 44B determines that the received ultrasonic wave is the own wave.

In this way, according to the second embodiment, even if the relative speed between the vehicle and the object is not known, it is possible to suppress an influence of the Doppler effect in the own wave determination. Note that the number of transmission times is not limited to two, but may be three or more.

5. Third Embodiment

Figure 13:
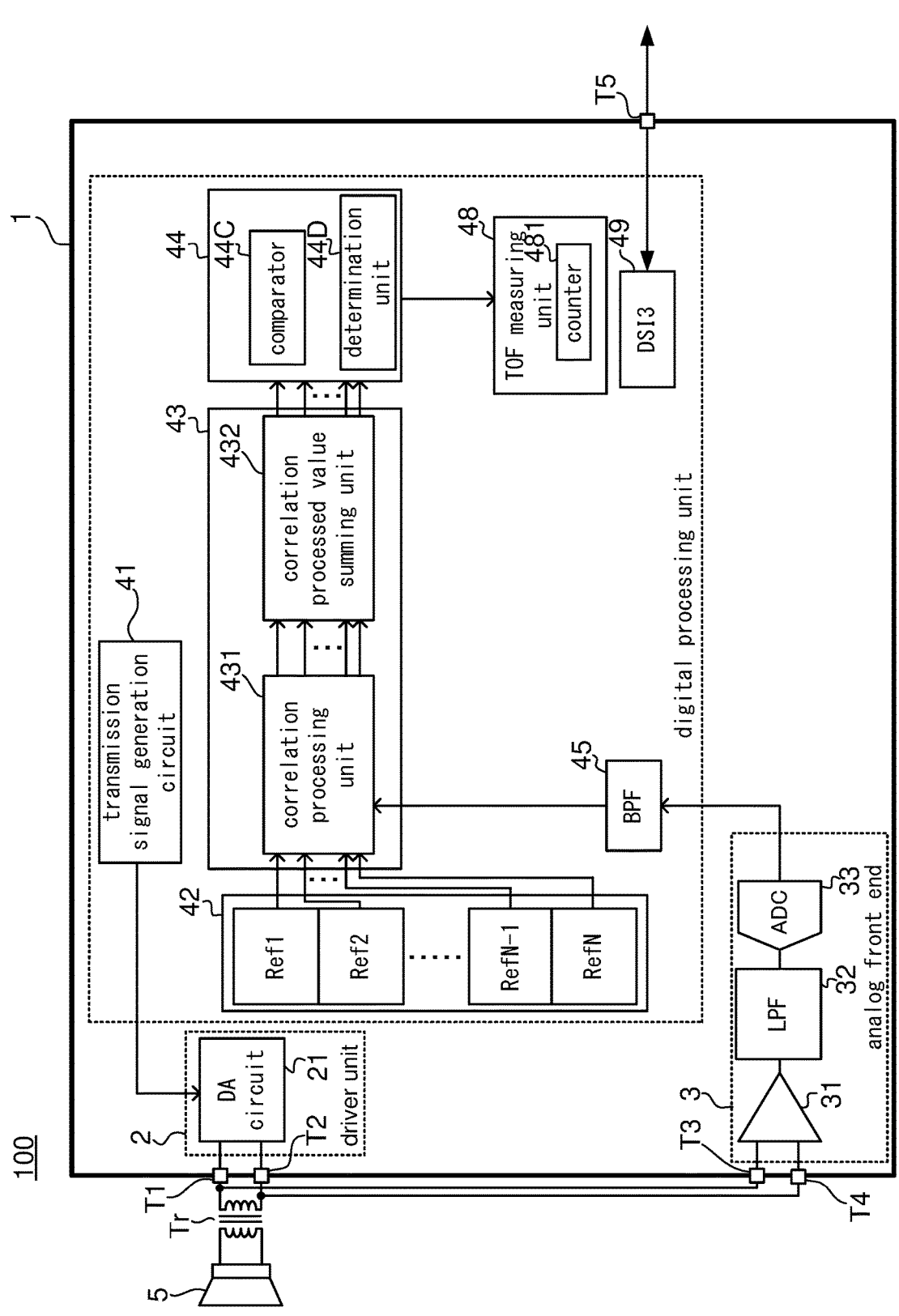
FIG. 13 is a diagram illustrating a structure of the ultrasonic system according to a third embodiment.

A third embodiment described here is implemented to solve the problem due to an influence of the Doppler effect similarly to the second embodiment. FIG. 13 is a diagram illustrating a structure of the ultrasonic system 100 according to the third embodiment. The structure illustrated in FIG. 13 is different from that of the second embodiment (FIG. 7) in that it does not include the envelope detection unit 46 as well as the comparator 47, and that the structure of the own wave identification unit 44 is different. In this embodiment, the own wave identification unit 44 includes a comparator 44C and a determination unit 44D.

In this embodiment, the transmission signal generation circuit 41 allows the ultrasonic wave transmitting/receiving device 5 to transmit the ultrasonic wave having a first frequency (e.g., 58 kHz) and the ultrasonic wave having a second frequency (e.g., 56 kHz) different from the first frequency in a continuous manner.

The comparator 44C compares the correlation-convolution integral value of each reference wave data output from the correlation processed value summing unit 432 with a predetermined threshold value. If the frequency of the reference wave data having the correlation-convolution integral value larger than the threshold value is shifted from the first frequency and the second frequency in the same direction by the same amount, the determination unit 44D determines that the received ultrasonic wave is the own wave.

For instance, when the first and second frequencies are 58 kHz and 56 kHz, respectively, and if the received reflected waves are 59 kHz and 57 kHz, shifted from the first and second frequency, respectively, due to the Doppler effect, then their shifts are in the same direction by the same amount (+1 kHz), and hence it can be determined to be the own wave.

According to this embodiment, it is possible to suppress an influence of the Doppler effect, and to identify the own wave by one time transmission. In addition, the own wave can be identified by combination of the first frequency and the second frequency. Note that frequencies of the ultrasonic waves that are transmitted in a continuous manner may be three or more frequencies.

<6. Plurality of Ultrasonic Systems>

Figure 14:
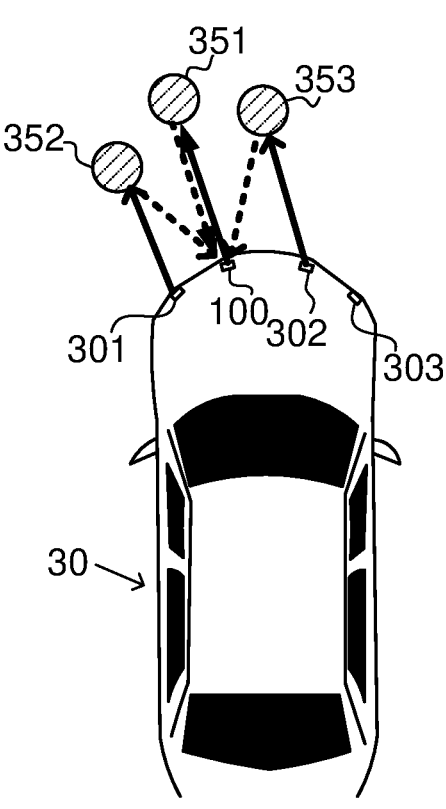
FIG. 14 is a schematic diagram illustrating an example of a vehicle equipped with a plurality of ultrasonic systems.

FIG. 14 illustrates a state where a plurality of ultrasonic systems, including the ultrasonic system 100 according to the embodiments described above, are mounted on a vehicle 30 at the front end part, as an example. Other than the ultrasonic system 100, ultrasonic systems 301 to 303 are mounted on the vehicle 30. The ultrasonic system 100, and the ultrasonic systems 301 to 303 may perform the transmission of the ultrasonic wave and the TOF measurement in turn, but in this case, the frequency of measuring the distance to the object by the same ultrasonic system may be decreased, and the vehicle 30 may be unnecessarily close to the object, for example.

Therefore, it is preferred that the ultrasonic system 100 and the ultrasonic system 301 to 303 concurrently perform the transmission of the ultrasonic wave and the TOF measurement. In this case, as illustrated in FIG. 14 for example, besides the reflected wave of the ultrasonic wave transmitted from the ultrasonic system 100 and reflected by an object 351, other reflected waves of the ultrasonic waves transmitted from the ultrasonic systems 301 and 302 and reflected by objects 352 and 353, respectively, may be received by the ultrasonic system 100.

However, also in this case, the ultrasonic waves transmitted from the ultrasonic systems 301 and 302 have frequencies different from the transmitted wave frequency set in the own ultrasonic system 100 (or a different combination of frequencies in the third embodiment), and hence on the basis of determination by the own wave identification unit 44, it is possible to avoid an interference by the ultrasonic waves from the other ultrasonic systems 301 and 302.

<7. Others>

Although the embodiments are described above, the embodiments can be variously modified within the scope of the spirit of the present invention.

For instance, the driver unit 2 may be connected to an ultrasonic wave transmitting device for transmission, and the analog front end 3 may be connected to an ultrasonic wave receiving device for reception separately from the ultrasonic wave transmitting device. In other words, the sound source and the receiver may not be the same device.

In addition, the ultrasonic system including the sound wave processing device may be mounted on a mobile body other than a vehicle, and it may be mounted on an unmanned transport robot for transporting a baggage, a service robot, or the like, for example. In addition, the ultrasonic system may be mounted not on a mobile body but on a fixed object.

<8. Additional Remarks>

As described above, for example, a sound wave processing device (1) according to the present disclosure includes:

a transmission signal generation unit (41) that generates a transmission signal for transmitting a sound wave;

a received wave signal output unit (3) that outputs a received wave signal based on receiving the sound wave;

a correlation-convolution integral processing unit (43) that performs correlation-convolution integral processing in parallel for each reference wave data, on the basis of the received wave signal and a plurality of reference wave data (Ref1 to RefN); and an own wave identification unit (44) that determines whether or not the received sound wave is own wave, which is a reflected wave of the sound wave transmitted by the transmission signal generation unit, on the basis of a correlation-convolution integral value output from the correlation-convolution integral processing unit (first structure).

In addition, in the first structure described above, the own wave identification unit (44) may be configured to include a correlation maximum value acquisition unit (44A) that acquires a maximum value of the correlation-convolution integral value (correlation maximum value) during a predetermined period for each of the reference wave data, and a determination unit that determines whether or not the received ultrasonic wave is the own wave, on the basis of relative evaluation of the acquired correlation maximum value (second structure).

In addition, in the second structure described above, the determination unit (44B) may be configured to determine a frequency of the reference wave data at which the acquired correlation maximum value becomes maximum (third structure).

In addition, in the second structure described above, if frequencies of the reference wave data of three largest of the acquired correlation maximum values are three neighboring frequencies, the determination unit (44B) may be configured to identify the center frequency of the three neighboring frequencies (fourth structure).

In addition, in any one of the second to fourth structures described above, the sound wave processing device may further include an envelope detection unit (46) that extracts an envelope of the received wave signal, and a comparator (47) that compares the extracted envelope with a predetermined threshold value, in which the predetermined period may be a period after the envelope exceeds the threshold value until it becomes the threshold value or less (fifth structure).

In addition, in the fifth structure described above, the sound wave processing device may further include a band pass filter (45) that extracts a signal in a predetermined band from the received wave signal and outputs the same to the envelope detection unit (sixth structure).

In addition, in any one of the second to sixth structures described above, the correlation maximum value may be a maximum value of absolute values of the correlation-convolution integral values (seventh structure).

In addition, in any one of the first to seventh structures described above, the transmission signal generation unit (41) may perform a plurality of times of transmission, and if the correlation-convolution integral value becomes large at the same frequency of the reference wave data in the plurality of times of transmission, the own wave identification unit (44) may determine the received ultrasonic wave is the own wave (eighth structure).

In addition, in any one of the first to seventh structures described above, the transmission signal generation unit (41) may transmit a plurality of sound waves having different frequencies in a continuous manner, and if the frequency of the reference wave data at which the correlation-convolution integral value becomes large is shifted in the same direction by the same amount from the plurality of frequencies, the own wave identification unit (44) may determine the received ultrasonic wave is the own wave (ninth structure).

In addition, in any one of the first to ninth structures described above, the sound wave processing device may further include a first external terminal (T1, T2) that enables connection of the transmission signal generation unit (41) to an external ultrasonic wave transmitting/receiving device (5), and a second external terminal (T3, T4) that enables connection of the ultrasonic wave transmitting/receiving device to the received wave signal output unit (3) (tenth structure).

In addition, an ultrasonic system (100) according to the present disclosure includes the sound wave processing device (1) according to the tenth structure described above, and the ultrasonic wave transmitting/receiving device (5) (eleventh structure).

In addition, the sound wave processing device (1) according to any one of the first to tenth structures described above may be configured to be mounted on a vehicle (twelfth structure).

In addition, an ultrasonic system according to the present disclosure, which is an ultrasonic system capable of being mounted on a vehicle, may include a first ultrasonic system (100) including the sound wave processing device (1) of the twelfth structure described above, and at least one second ultrasonic system (301, 302, 303) other than the first ultrasonic system, in which the first ultrasonic system and the second ultrasonic system may concurrently perform transmission of an ultrasonic wave and TOF (Time Of Flight) measurement.

INDUSTRIAL APPLICABILITY

The present disclosure can be used for an on-vehicle ultrasonic system, for example.

LIST OF REFERENCE SIGNS 1 sound wave processing device
2 driver unit
3 analog front end
4 digital processing unit
5 ultrasonic wave transmitting/receiving device
6 A/D converter
7 reference wave storage unit
8 correlation-convolution integral processing unit
9 comparator
10 reception processing unit
21 DA circuit
30 vehicle
31 low noise amplifier
32 low pass filter
33 A/D converter
41 transmission signal generation circuit
42 register
43 correlation-convolution integral processing unit
44 own wave identification unit
44A correlation maximum value acquisition unit
44B determination unit
44C comparator
44D determination unit
46 envelope detection unit
47 comparator
48 TOF measuring unit
49 serial interface
81 correlation processing unit
82 correlation processed value summing unit
100 ultrasonic system
301-303 ultrasonic system
351-353 object
431 correlation processing unit
432 correlation processed value summing unit
481 counter
500 vehicle
1000 object
DF0-DFn flip-flop group
M0-Mn multiplication unit
SR shift register
SUM sum calculation unit
T1-T5 external terminal
Tr transformer

The invention claimed is:

1. A sound wave processing device comprising:
a transmission signal generation unit that generates a transmission signal for transmitting a sound wave;
a received wave signal output unit that outputs a received wave signal based on receiving the sound wave;

a correlation-convolution integral processing unit that performs correlation-convolution integral processing in parallel for each reference wave data, on the basis of the received wave signal and a plurality of reference wave data; and
an own wave identification unit that determines whether or not the received sound wave is own wave, which is a reflected wave of the sound wave transmitted by the transmission signal generation unit, on the basis of a correlation-convolution integral value output from the correlation-convolution integral processing unit,
wherein the own wave identification unit includes a correlation maximum value acquisition unit that acquires a correlation maximum value of the correlation-convolution integral value during a predetermined period for each of the reference wave data, and a determination unit that determines whether or not the received ultrasonic wave is the own wave, on the basis of relative evaluation of the acquired correlation maximum value.

2. The sound wave processing device according to claim 1, wherein the determination unit determines a frequency of the reference wave data at which the acquired correlation maximum value becomes maximum.

3. The sound wave processing device according to claim 1, wherein if frequencies of the reference wave data of three largest of the acquired correlation maximum values are three neighboring frequencies, the determination unit identifies the center frequency of the three neighboring frequencies.

4. The sound wave processing device according to claim 1, further comprising:
an envelope detection unit that extracts an envelope of the received wave signal, and
a comparator that compares the extracted envelope with a predetermined threshold value, wherein
the predetermined period is a period after the envelope exceeds the threshold value until it becomes the threshold value or less.

5. The sound wave processing device according to claim 4, further comprising a band pass filter that extracts a signal in a predetermined band from the received wave signal and outputs the same to the envelope detection unit.

6. The sound wave processing device according to claim 1, wherein the correlation maximum value is a maximum value of absolute values of the correlation-convolution integral values.

7. The sound wave processing device according to claim 1, wherein
the transmission signal generation unit performs a plurality of times of transmission, and
if the correlation-convolution integral value becomes large at the same frequency of the reference wave data in the plurality of times of transmission, the own wave identification unit determines that the received sound wave is the own wave.

8. The sound wave processing device according to claim 1, wherein the transmission signal generation unit transmits a plurality of sound waves having different frequencies in a continuous manner, and if the frequency of the reference wave data at which the correlation-convolution integral value becomes large is shifted in the same direction by the same amount from the plurality of frequencies, the own wave identification unit determines that the received sound wave is the own wave.

9. The sound wave processing device according to claim 1, further comprising:

a first external terminal that enables connection of the
transmission signal generation unit to an external ultra-
sonic wave transmitting/receiving device; and
a second external terminal that enables connection of the
ultrasonic wave transmitting/receiving device to the
received wave signal output unit.

10. The sound wave processing device according to claim
1, which is capable of being mounted on a vehicle.

11. An ultrasonic system comprising the sound wave
processing device according to claim 9, and the ultrasonic
wave transmitting/receiving device.

12. An ultrasonic system capable of being mounted on a
vehicle, comprising:

a first ultrasonic system including the sound wave pro-
cessing device according to claim 10; and
at least one second ultrasonic system other than the first
ultrasonic system,
wherein the first ultrasonic system and the second ultrasonic
system concurrently perform transmission of an ultrasonic
wave and TOF (Time Of Flight) measurement.

* * * * *